Aug. 4, 1925.
N. BRANOVICH
ARMOR PROTECTED FUEL TANK
Filed Feb. 16, 1924
1,548,441
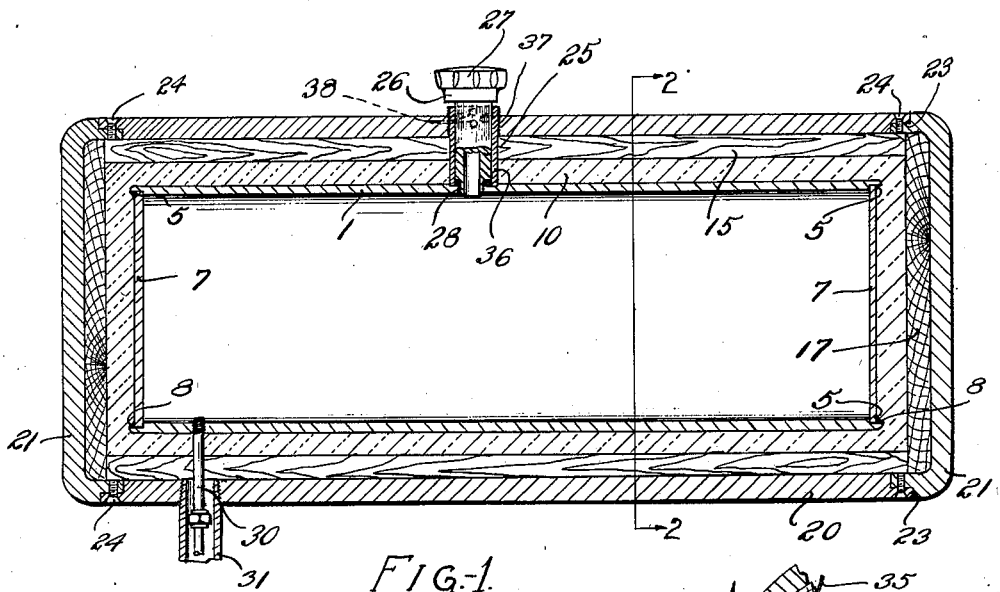
FIG.-1.
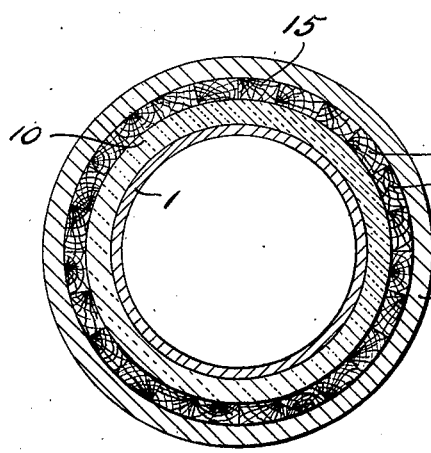
FIG. 2.
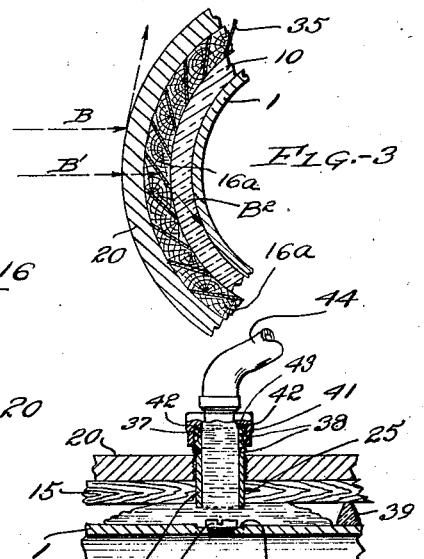
FIG.-3
FIG.-4
INVENTOR
Nick Branovich,
BY Balto & Macklin
ATTORNEYS Patented Aug. 4, 1925.

1,548,441

UNITED STATES PATENT OFFICE.

NICK BRANOVICH, OF CLEVELAND, OHIO.

ARMOR-PROTECTED FUEL TANK.

Application filed February 16, 1924. Serial No. 693,170.

*To all whom it may concern:*

Be it known that I, NICK BRANOVICH, a citizen of the United States, residing at Cleveland, in the county of Cuyahoga and State of Ohio, have invented a certain new and useful Improvement in Armor-Protected Fuel Tanks, of which the following is a full, clear, and exact description, reference being had to the accompanying drawings.

This invention relates to armored fuel tanks for airships or airplanes. The general object of the invention is the provision of an adequately armored fuel tank capable of being easily and cheaply manufactured and of not too great weight.

Another object is the provision of a simply formed wall for a fuel tank of such construction that even though the wall be perforated, the leaking of the tank is effectively prevented.

Another object of my invention is to provide within the outer and inner layers of a fuel tank wall, angular deflecting means in combination with the fibre or wooden staves that shall augment the glancing effect of a projectile against a curved wall.

A still further object is the provision of a highly efficient method of forcing a layer of puncture closing semi-fluid material, such as uncured rubber into the cavity between two of the alternate layers of wall sheathing and of entrapping it therein under pressure.

Other objects will become apparent in the further description of the invention which pertains to the accompanying drawings and its essential characteristics will be summarized in the claims.

In the drawings, Fig. 1 is a vertical cross-section taken longitudinally of the tank; Fig. 2 is a transverse cross-section taken along the lines 2—2 of Fig. 1. Fig. 3 is a fragmentary cross section taken similarly to Fig. 2 showing an alternate form of wall construction. Fig. 4 is a fragmentary cross section taken through the filler tube opening showing one method of applying the puncture closing layer within the tank wall.

The inner lining of my tank I prefer to construct as follows:—A continuous metal tube 1, preferably of steel, is undercut, as at 5, at its ends for the reception of the end disc portions 7 and the joints so formed may be effectively sealed with solder or by welding as at 8. Adjacent this inner shell, I prefer to provide a layer of semi-cured rubber or other semi-fluid substance 10 surrounded by a layer of approximately the same thickness of wood 15. This layer may be formed of staves as shown in Figs. 2 and 3 and I would consider it within the scope and spirit of my invention to dovetail these staves or form them of any convenient shape. The end portions may be discs 17 which may lie against the ends of the staves or which may be joined to them by a continuous groove or dowel tongue. In the drawing, however, I have simply indicated the staves as laid one against the other.

I have found a convenient method of forming the two layers just described by building the wooden casing about the inner shell, spacing it from the shell by slugs or blocks of cured rubber shown at 39 in Fig. 4 after which the semi-cured rubber for the second layer may be forced into the cavity so formed under pressure. The opening provided for the intake pipe 25 may serve to admit the rubber in a manner to be later described. The outer casing I have shown as formed of a cylinder of armor plate 20 having end portions 21, said end portions being preferably cup shaped and joined in any way to the cylinder portion as for instance by the rabbeted joint 23. Screws 24 may be used to secure the overlapped edges of the joint together. The intake pipe 25 is preferably a heavy tube 26 threaded at the top for the cap 27 and having a reduced portion 28 at the inner end threaded into the inner shell of the tank. The outlet tube 30 may be formed in similar manner and a protective tube 31 provided throughout its length.

By virtue of this construction, it will be seen that an effective protection against projectiles of any sort, is provided.

The fibrous and elastic character of the two intermediate layers, namely the wood and uncured rubber will impart a high degree of resiliency to the tank, better to resist concussion likely to tear the tank loose from its fastening. Moreover, I have found by experiment that it is much more difficult to effectively penetrate a plate of steel backed by fibre or other resisting material than one backed directly by a more solid structure, such as metal. Much weight is thereby eliminated from the tank and at the same time a greater resistance given the plate. The rubber serves both as a shock absorbing means and as a filler for perforations. In the case of projectiles piercing the two outer layers and the inner shell as well, the rubber will flow into the aperture so made and effectively seal the wall against leaking fuel.

A modified form of wall construction is illustrated in Fig. 3 in which I retain the inner wall 1, the semi-fluid wall 10 and the outer shell 20 as above described but in which the staves 16$^a$ comprising the wall section 15 are set at an angle to the circumference and between which I have provided thin hardened metal plates that shall augment the outer shell in deflecting projectiles away from the inner container 1 in the following manner.

If the projectile approaches the tank along the line B the curvature of the outer armor shell will serve to deflect it from its path as shown while a projectile approaching along the lines B' radially of the circularly formed tank will, though it penetrates the outer shell, be deflected by the plates 35 at an angle to the inner shell, and will follow a line of least resistance such as B$^2$ through the semi-fluid layer thereby protecting the shell.

My preferred method of filling the cavity between the inner shell 1 and the layer of wood 15 is illustrated in Fig. 4. Herein I have provided a sleeve 36 threaded externally at 37 and adapted to tightly fit the opening in the wooden layer 25. In the position shown the upper end of the sleeve is capped by a hose attaching nut 41, undercut as at 42 in such a manner that the seat 43 so formed may rest upon the upper end of the sleeve. A sufficiently tight connection is so made between the tube 43 and the sleeve 38 but which will allow the ready removal of the cap nut without disturbing the position of the sleeve. Previous to applying the sleeve and tube connections, I insert a temporary plug 40 into the opening 28. The semi-cured rubber is forced through the tube 44, down the sleeve and into the cavity under pressure, suitable provision (not shown) being made for allowing the air to escape from the cavity, such as a temporary bleeder hole in the layer 15 on the opposite side of the tank. When the cavity is completely full the sleeve 36 is threaded into the shell 20 by means of a series of spanner recesses 38 in the upper end of the sleeve, until it seats into the recessed portion of the inner shell shown at 45, thereby closing the cavity. The coupling nut 41 is unscrewed from the sleeve at the same time that the sleeve is being screwed into the plate 20. The plastic material is then cleaned out of the sleeve and the plug 40 removed from the inner shell. The tank is then ready for the insertion of the intake 26.

I claim:

1. In combination a fuel tank comprising a heavy outer shell of metal, a continuous series of overlapped staves formed of fibrous material adjacent the outer shell, a series of metal deflecting plates interposed between the staves, and a fuel container comprising a layer of puncture filling material and a metal lining encased by said series of staves.

2. A fuel tank comprising in combination an outer shell of metal, an alternate series of angularly disposed staves of wood and metal encased by said shell a layer of permanently plastic material adjacent said staves and a continuous metal lining for the tank for retaining the plastic material in place.

In testimony whereof, I hereunto affix my signature.

NICK BRANOVICH.